US009663229B2

United States Patent
Funk et al.

(10) Patent No.: US 9,663,229 B2
(45) Date of Patent: May 30, 2017

(54) OVERHEAD STORAGE COMPARTMENT COVER ASSEMBLY AND METHODS TO USE SAME

(71) Applicant: Harper Engineering Co., Renton, WA (US)

(72) Inventors: Ryan Funk, Puyallup, WA (US); Richard J. LaConte, Black Diamond, WA (US)

(73) Assignee: Harper Engineering Co., Renton, WA (US)

( * ) Notice: Subject to any disclaimer, the term of this patent is extended or adjusted under 35 U.S.C. 154(b) by 76 days.

(21) Appl. No.: 14/711,322

(22) Filed: May 13, 2015

(65) Prior Publication Data
US 2015/0329207 A1   Nov. 19, 2015

Related U.S. Application Data

(60) Provisional application No. 61/992,686, filed on May 13, 2014.

(51) Int. Cl.
*B64D 11/00* (2006.01)
*B64F 5/00* (2017.01)

(52) U.S. Cl.
CPC .............. *B64D 11/003* (2013.01); *B64F 5/00* (2013.01); *Y02T 50/46* (2013.01); *Y10T 29/49828* (2015.01); *Y10T 156/10* (2015.01)

(58) Field of Classification Search
CPC .............................. B64D 11/00; B64D 11/003
USPC ..................................................... 244/118.5
See application file for complete search history.

(56) References Cited

U.S. PATENT DOCUMENTS

| 2006/0214055 | A1* | 9/2006 | Novak | B64D 11/003 244/118.5 |
|---|---|---|---|---|
| 2007/0095980 | A1 | 5/2007 | Bock | |
| 2007/0148409 | A1* | 6/2007 | Rios | A43B 13/22 428/167 |
| 2011/0139929 | A1* | 6/2011 | Young | B64D 11/003 244/118.5 |
| 2011/0253837 | A1* | 10/2011 | Lee | B64D 11/003 244/118.5 |
| 2012/0012702 | A1* | 1/2012 | Moritz | F16F 1/18 244/118.5 |

(Continued)

FOREIGN PATENT DOCUMENTS

WO            99/17958 A1       4/1999

OTHER PUBLICATIONS

International Search Report and Written Opinion, mailed Jul. 22, 2015, for corresponding International Application No. PCT/US2015/030577, 8 pages.

*Primary Examiner* — Tien Dinh
*Assistant Examiner* — Aaron Rodziwicz
(74) *Attorney, Agent, or Firm* — Seed IP Law Group LLP

(57) ABSTRACT

A stowage bin cover assembly coupleable to a stowage bin is provided. The stowage bin cover assembly includes a stowage bin cover coupleable to the stowage bin, the stowage bin cover including a first groove; and an anti-slip strip coupleably received in the first groove. The anti-slip strip can be positioned and oriented to project above an uppermost outer surface of the first groove such that the anti-slip strip will frictionally engage a payload received in the stowage bin, the frictional engagement resisting movement of the payload. Related methods are also provided.

20 Claims, 4 Drawing Sheets

(56) References Cited

U.S. PATENT DOCUMENTS

| | | | | |
|---|---|---|---|---|
| 2013/0233971 A1* | 9/2013 | Burrows | ............... | B64D 11/003 244/118.5 |
| 2015/0102167 A1* | 4/2015 | Smith | ................... | B64D 11/003 244/118.5 |

* cited by examiner

OVERHEAD STORAGE COMPARTMENT COVER ASSEMBLY AND METHODS TO USE SAME

BACKGROUND

Technical Field

The present disclosure is generally directed to overhead storage compartments and, more particularly, to overhead stowage bin cover assemblies.

Description of the Related Art

Transportation vehicles, such as airplanes, for example, typically include overhead storage compartments to allow passengers to store luggage, equipment, and other types of payload. The overhead storage compartments comprise overhead stowage bin assemblies. The overhead stowage bin assemblies are typically arranged to be above the passenger seats located in an aircraft's cabin. Thus, overhead stowage bin assemblies are often positioned at outboard ends of the left and right sides of the fuselage above the outboard cabin seats, and at the center of the fuselage, above the center cabin seats.

The stowage bin assemblies generally include bin buckets that are pivotably coupled to stowage bin frames, the stowage bin frames being mounted to the aircraft fuselage. The bin buckets are configured to pivot between open and closed positions. The bin buckets pivotably rotate relative to respective pivot axes that are substantially parallel to the longitudinal axis of the fuselage, i.e., an axis that runs parallel to the forward-aft direction of the fuselage. The pivotable movement of the bin buckets is facilitated through various latch mechanisms, which are located within the interior space of the bin buckets and, often, on the inside surfaces of the bin buckets.

To protect the latch mechanisms from contact and/or interference with the luggage or other types of payload being stored in the stowage bin assemblies, a cover assembly is typically secured to the bin buckets. The cover assembly overlies the latch mechanisms. However, the cover assembly is unable to provide sufficient resistance to downward movement of the luggage or payload when the bin buckets are moved to the open position. The gravitational force along with migration of the luggage during flight can lead to the luggage falling on users opening the stowage bin assemblies. Solutions to mitigate migrating luggage have often involved using cover assemblies with a raised edge stop that may operate as an obstacle to, at least, partially resist downward movement of the luggage. Such solutions, however, have been unsuccessful because the luggage is often made with smooth materials, such that the luggage follows along the contour of the edge stop and thus overcomes the obstruction. Other solutions have involved raising the height of the edge stop to enlarge the obstruction. However, raising the height of the edge stop adds to manufacturing costs, unnecessary weight, and reduces the opening within the bucket bins through which passengers may load the luggage.

BRIEF SUMMARY

Embodiments described herein advantageously provide stowage bin cover assemblies and methods to prevent and/or resist unintentional migration of payload received in stowage bins with robust and efficient form factors. Various embodiments described herein also advantageously provide weight and cost savings.

In some embodiments, a stowage bin cover assembly coupleable to a stowage bin may be summarized as including a stowage bin cover coupleable to the stowage bin, the stowage bin cover including a first groove; and an anti-slip strip coupleably received in the first groove. The anti-slip strip may be positioned and oriented to project above an uppermost outer surface of the first groove such that the anti-slip strip will frictionally engage a payload received in the stowage bin, where the frictional engagement may resist movement of the payload.

In some embodiments, a stowage bin cover assembly coupleable to an aircraft stowage bin moveable between a closed position and an open position, where the aircraft stowage bin includes a latch mechanism operable to pivotably rotate the aircraft stowage bin from the closed position to the open position to expose a payload received therein to an exterior of the aircraft stowage bin, may be summarized as including a stowage bin cover coupled to the aircraft stowage bin and arranged to overlie the latch mechanism; and a pair of anti-slip strips. The stowage bin cover may include a pair of grooves. The pair of anti-slip strips may be coupleably received in the respective grooves, where the anti-slip strips may be configured to frictionally engage a contact surface of the payload, the frictional engagement resisting movement of the payload when the payload moves towards the exterior when the aircraft stowage bin is in the open position.

In some embodiments, a method to resist downward movement of luggage received in an aircraft overhead stowage bin may be summarized as including coupling a stowage bin cover to the aircraft overhead stowage bin; and coupling an anti-slip strip to the stowage bin cover, where the anti-slip strip frictionally engages the luggage to resist movement of the luggage.

DETAILED DESCRIPTION

Figure 1:
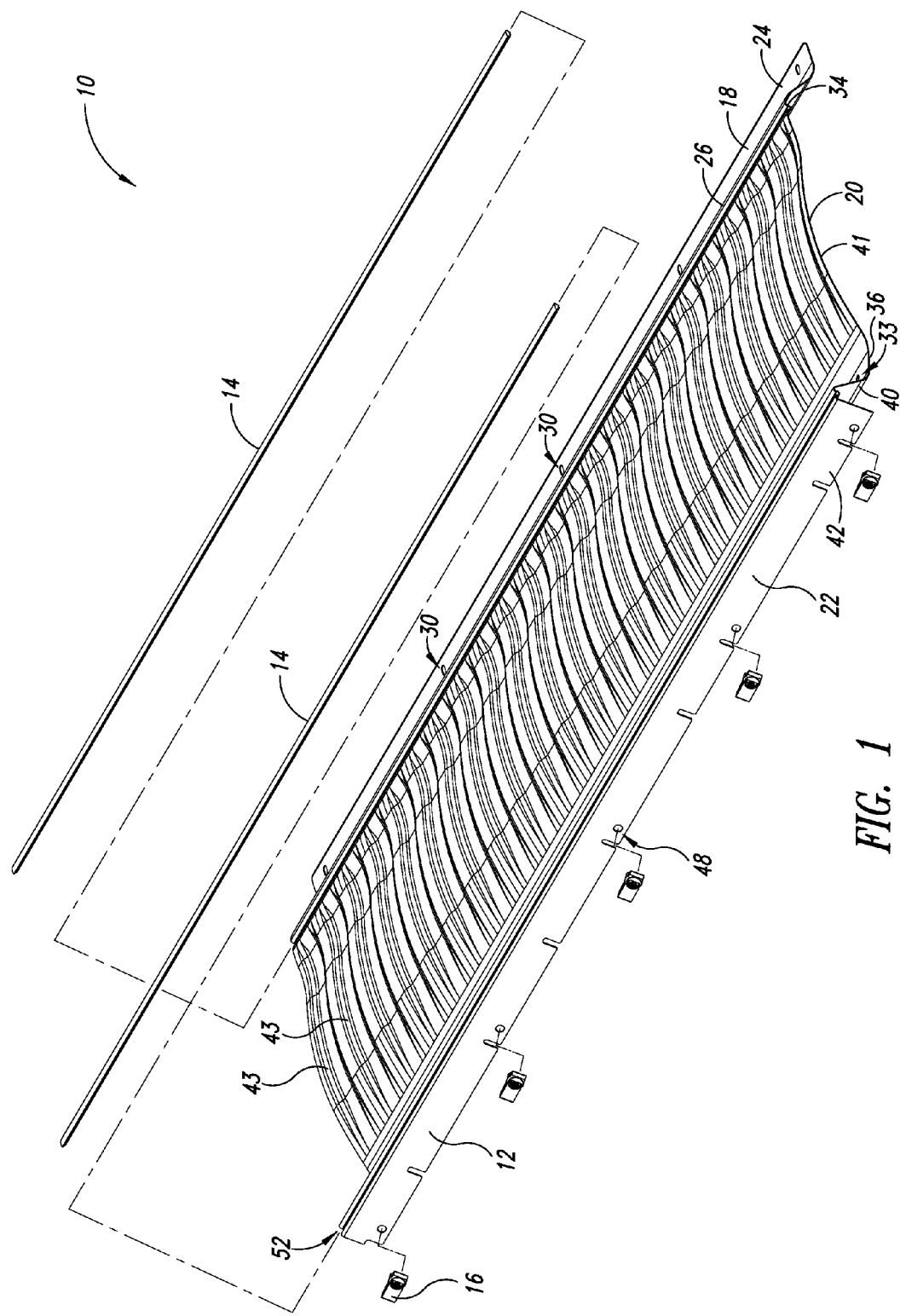
FIG. 1 is an exploded view of a stowage bin cover assembly, according to one embodiment.
Figure 2:
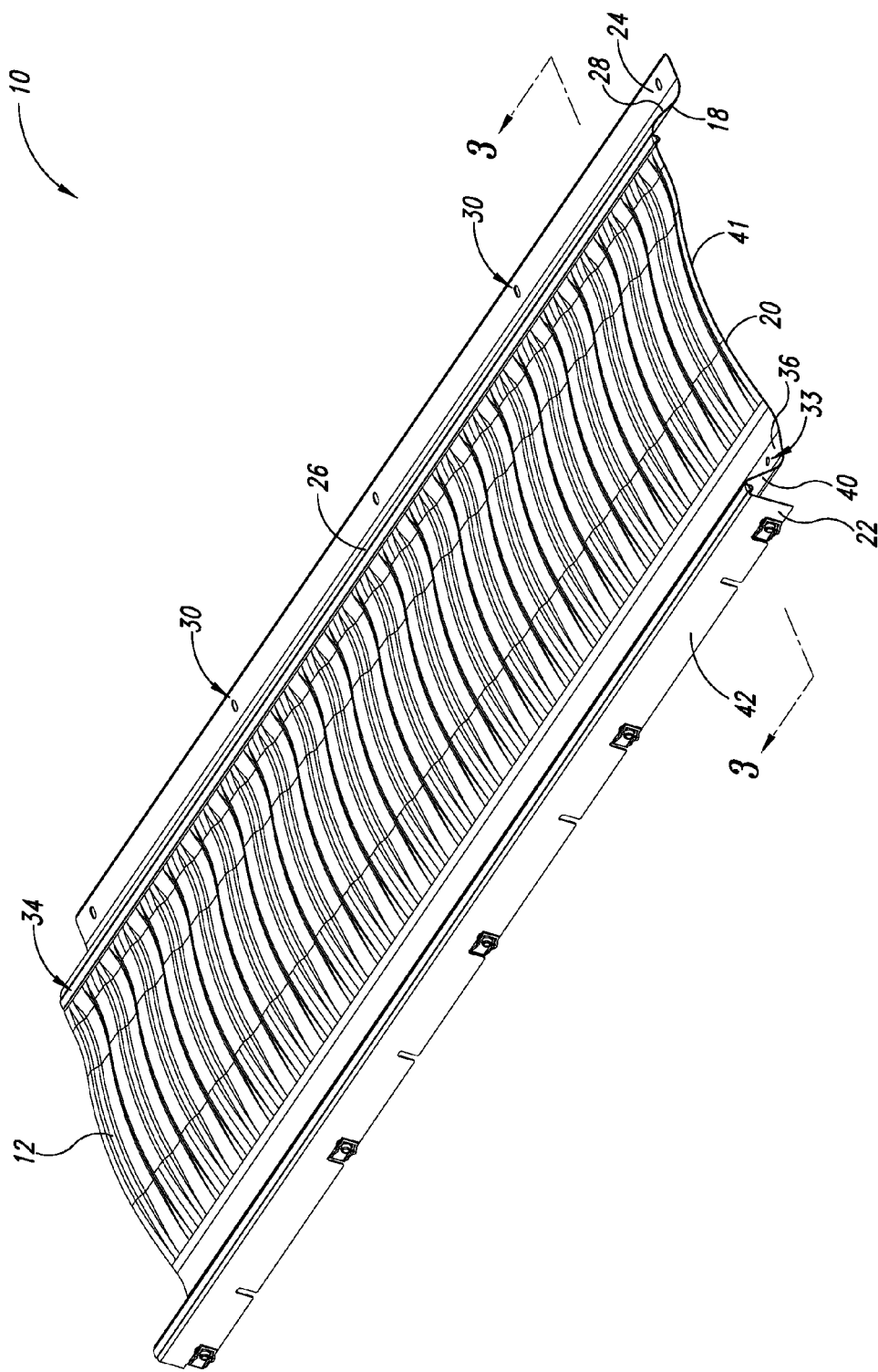
FIG. 2 is an isometric view of the stowage bin cover assembly of FIG. 1.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with stowage bin assemblies have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

FIGS. 1 through 5 illustrate a stowage bin cover assembly 10, according to one embodiment. The stowage bin cover assembly 10 comprises a stowage bin cover 12, a pair of anti-slip strips 14, and optionally a plurality of clip nuts 16. The stowage bin cover 12 is configured to couple to an overhead stowage bin of an aircraft, for example. The stowage bin cover 12 includes an end portion 18, a center portion 20, and an edge portion 22. The end and edge portions 18, 22 are configured to couple to the overhead stowage bin, in particular, to a bin bucket 17 (FIG. 3) of the overhead stowage bin.

The end portion 18 has a substantially S-shaped cross-section, having lower and upper flanges 24, 26 extending in opposite directions from a central web 28. The lower flange 24 extends angularly with respect to the central web 28. The angular displacement is selected such that the lower flange 24 substantially matches a contour of the bin bucket 17. In this manner, the lower flange 24 is configured such that an outer surface of the lower flange 24 makes substantial contact with a corresponding contact surface of the bin bucket 17. In the longitudinal direction, e.g., the forward-aft direction of the fuselage, the lower flange 24 includes a plurality of spaced apart apertures 30. The plurality of apertures 30 are sized and shaped for receiving fasteners to couple the stowage bin cover 12 to the bin bucket 17. Alternatively, the lower flange 24, in some embodiments, may be adhesively coupled to the bin bucket 17.

The central web 28 of the end portion 18 extends upwardly with respect to the lower flange 24, and smoothly transitions in this manner from one end of the central web 28. The upper flange 26 extends in the opposite direction to the lower flange 24. Again, the upper flange 26 smoothly transitions in this manner from the other end of the central web 28 to the central portion 20 to at least, in part, define an internal cavity 32 of the stowage bin cover assembly 10. At a location where the upper flange 26 transitions to the central portion 20, a first groove member 34 is formed therebetween. The first groove member 34 forms a substantially sinusoidal cross-section with a pair of ridges 35 and a trough 37 therebetween to define a first groove 39. Although the first groove member 34 forms a substantially sinusoidal cross-section, in some embodiments, the first groove member 34 may have other cross-sectional shapes, such as a V-shaped cross-section, a U-shaped cross-section, or the like, to define corresponding grooves.

The central portion 20 generally follows a curvilinear or arcuate path 41 towards the edge portion 22. More particularly, the curvilinear path 41 assists in defining the internal cavity 32, such that the internal cavity 32 may be sized and shaped to overlie a wide variety of latch mechanisms and components thereof. For example, the internal cavity 32 may be sized and shaped to overlie a torque tube, and/or other components of various latch mechanisms, such that the stowage bin cover 12 protects the underlying latch mechanisms from contact and/or other interference. The curvilinear path 41 of the central portion 20 extends to a lower flange 36, where the lower flange 36 is angularly positioned with respect to the curvilinear path 41. In this manner, the lower flange 36 is configured to match the contour of the bin bucket 17, such that an outer surface of the lower flange 36 makes substantial contact with a corresponding contact surface of the bin bucket 17. In the longitudinal direction, the lower flange 36 includes a plurality of spaced apart apertures 33. The plurality of apertures 33 are sized and shaped for receiving fasteners to couple the stowage bin cover 12 to the bin bucket 17. Alternatively, the lower flange 36, in some embodiments, may be adhesively coupled to the bin bucket 17.

The central portion 20 further includes a plurality of spaced apart ribs 43. The plurality of ribs 43 are located substantially centrally with respect to the central portion 20. In the illustrated embodiment, the plurality of ribs 43 generally include a substantially hat-shaped cross-section. However, in other embodiments, the ribs 43 may comprise any other cross-section, such as U-shaped, Z-shaped, or the like. The plurality of ribs 43 advantageously provide stiffness to the stowage bin cover 12. In this manner, the stowage bin cover 12 can withstand forces generated by a wide variety of luggage or other payload. Providing the ribs 43 also provides additional weight savings by substantially reducing the gauge of the stowage bin cover 12, providing optimal cross-sectional profiles, and/or permitting use of materials with lower densities.

The edge portion 22 extends from a terminal edge of the lower flange 36 of the central portion 20 and forms a substantially M-shaped cross-section. More particularly, the edge portion 22 includes a pair of angular flanges 40, 42 that are angularly spaced apart from each other with respect to a vertical axis 44. The first angular flange 40 smoothly transitions from the central portion 20 and extends upwardly, where the height of the first angular flange 40 is selectively dimensioned to appropriately obstruct movement of the luggage, such as a suitcase or carry-on bag 49.

The first and second angular flanges 40, 42 are angularly spaced apart from each other to define an internal cavity 46. The internal cavity 46 is sized and shaped to facilitate coupling of the second angular flange 42 with the optional clip nuts 16. More particularly, the second angular flange 42 is configured to be selectively angularly spaced apart from the first angular flange 40, such that an external surface thereof substantially abuts and/or makes contact with a corresponding surface of an edge member or any other mating member of the bin bucket 17. Thus, in the longitudinal direction, the second angular flange 42 includes a plurality of spaced apart apertures 48. The plurality of apertures 48 are sized and shaped for receiving fasteners to couple to the edge member or any other mating member of the bin bucket 17. By way of example, in the illustrated embodiment, the legs of the optional clip nuts 16 are positioned to overlie the second angular flange 42 and the edge member of the stowage bin, such as an L-shaped bracket, for example, and, accordingly, couple the stowage bin cover 12 to the stowage bin in a known manner.

The edge portion 22 includes a second groove member 52 between the first and second angular flanges 40, 42. The second groove member 52 forms a substantially sinusoidal cross-section with a pair of ridges 54 and a trough 56 therebetween to define a second groove 58. Although the second groove member 52 forms a substantially sinusoidal cross-section, in some embodiments, the second groove member 52 may have other cross-sectional shapes, such as a V-shaped cross-section, a U-shaped cross-section, or the like, to define corresponding grooves.

Figure 3:
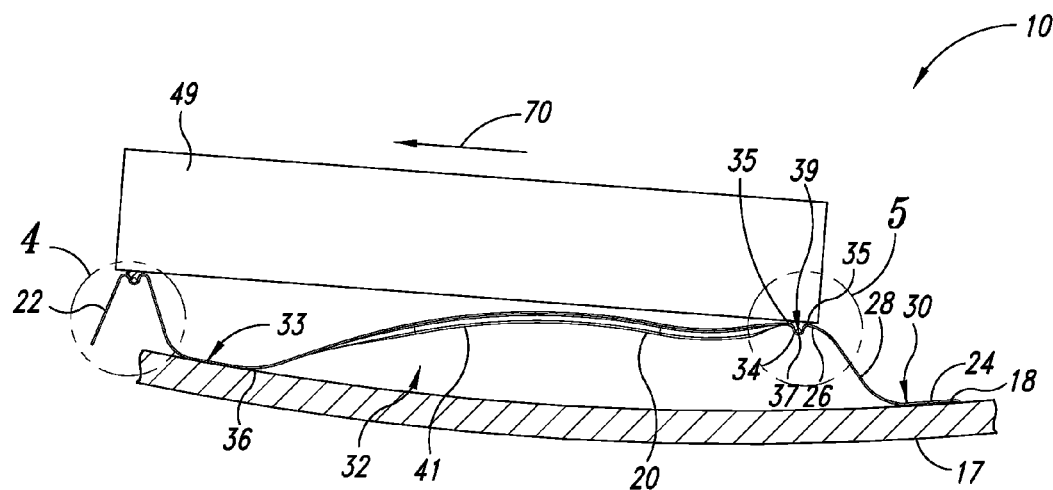
FIG. 3 is a cross-sectional view of the stowage bin cover assembly of FIG. 1, taken along line 3-3 of FIG. 2, illustrating the stowage bin cover assembly coupled to a stowage bin assembly.
Figure 4:
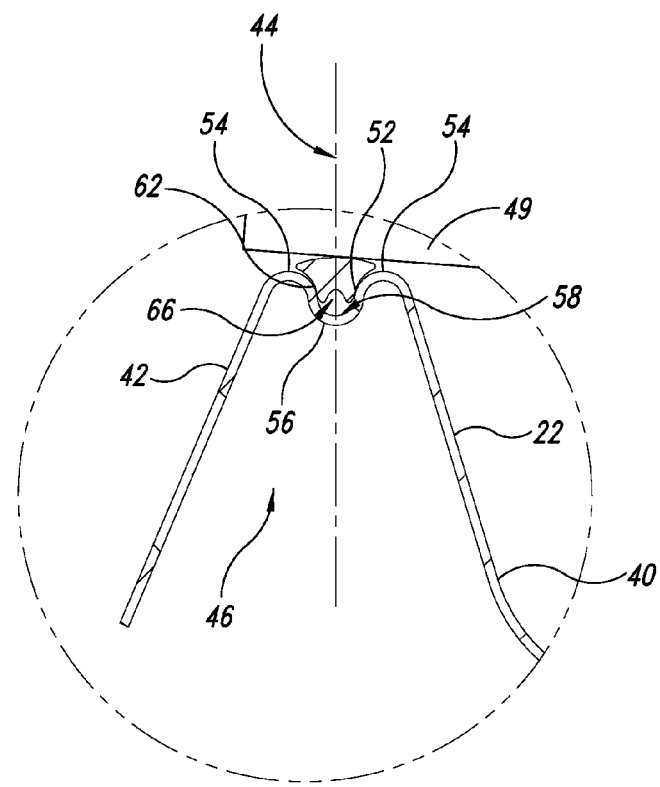
FIG. 4 is an enlarged view of a portion of the cross-sectional view of FIG. 3.
Figure 5:
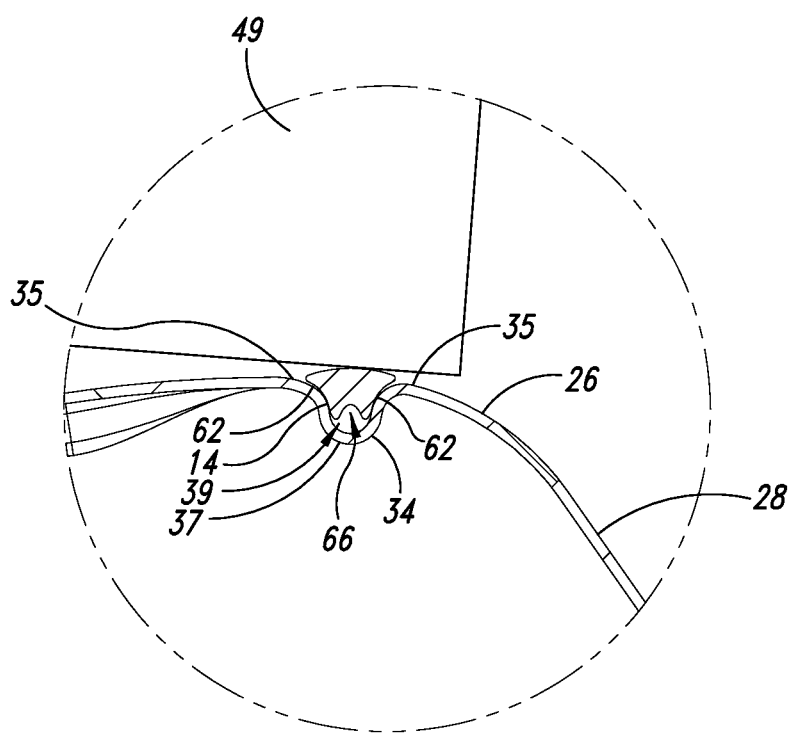
FIG. 5 is an enlarged view of a portion of the cross-sectional view of FIG. 3.

With continued reference to FIGS. 1 through 5, both the first and second groove members 34, 52 are sized and shaped to coupleably receive the respective anti-slip strip 14. As best seen in FIGS. 4 and 5, the anti-slip strips 14 include side edges 62, which substantially follow a curvilinear or arcuate path, the curvilinear path corresponding to the respective first and second grooves 39, 58. The anti-slip strips 14 further optionally include a recess 66. The recess 66 can advantageously reduce the stiffness of the anti-slip strip 14 to facilitate installation of the anti-slip strip 14 and/or provide weight savings.

In some embodiments, the anti-slip strips 14 may be adhesively coupled to the first and second groove members 34, 52. In other embodiments, the anti-slip strips 14 may be sized and shaped to be dimensionally larger than the corresponding size and shape of the first and second groove members 34, 52 to form a transition or interference fit. In yet other embodiments, the anti-slip strips 14 may be mechanically fastened to the first and second groove members 34, 52, or other portions of the stowage bin cover 12. Further, although the first and second groove members 34, 52 define grooves 39, 58 that have substantially similar profiles to coupleably receive the anti-slip strips 14, in other embodiments, the first and second grooves 39, 58 may each have different profiles and dimensions. Still further, although the embodiment illustrated in FIGS. 1 through 5 comprises two groove members 34, 52, in other embodiments, the stowage bin cover 12 may include any number of groove members to receive corresponding anti-slip strips 14.

The stowage bin cover 12 can be fabricated from any number of suitable materials, such as composites, plastics, metals, etc. By way of example, the stowage bin cover 12 can comprise glass fiber reinforced plastics, including the embodiment illustrated in FIGS. 1 through 5, or other carbon fiber reinforced plastics. Alternatively, the stowage bin cover 12 can comprise various metallic alloys, such as aluminum or titanium alloys, for example. The stowage bin cover 12 can be fabricated by thermoforming to facilitate the stowage bin cover 12 conforming to a desired shape. The stowage bin cover 12, in particular metal alloys, can be formed via machining, casting, forging, or molding processes. The stowage bin cover 12 can comprise any other suitable material and can be fabricated using various methods known in the art.

With continued reference to FIGS. 1 through 5 and, as best illustrated in FIGS. 3 through 5, the stowage bin cover assembly 10 advantageously prevents or, at least, resists migration of the luggage or payload, such as the suitcase or carry-on bag 49. As the stowage bin is pivotably rotated to the open position exposing the contents therein to an exterior of the stowage bin, the gravitational forces tend to move the suitcase or carry-on bag 49 in the direction indicated by arrow 70. However, as the suitcase or carry-on bag 49 begins to move, an outer surface of the suitcase or carry-on bag 49 makes contact with an outer surface of the anti-slip strip 14. In order to prevent or, at least partially, resist further movement of the suitcase or carry-on bag 49, the anti-slip strips 14 comprise resilient materials with high surface coefficients of friction. By way of example, the anti-slip strip 14 may comprise silicone, including the embodiment illustrated in FIGS. 1-5, urethane, polyurethane, rubber foams, or various rubber-like materials, or the like. Alternatively, the anti-slip strips 14 may be made of any material and may be externally coated with anti-slip agents. Thus, as the suitcase or carry-on bag 49 is moved in direction 70, the anti-slip strips 14 coupled to the first and second groove members 34, 52 apply frictional forces that, at least, partially counter or resist movement of the suitcase or carry-on bag 49. In this manner, unintended movement of the suitcase or carry-on bag 49 can advantageously be avoided. Further, having the first and second groove members 34, 52 spaced apart, as illustrated in the embodiment of FIGS. 1 through 5, provides constant frictional forces until the suitcase or carry-on bag 49 is completely removed from the stowage bin. By way of example, the second groove member 52 is advantageously located at the edge portion 22, which allows the anti-slip strip 14 coupled to the second groove member 52 to be in constant contact with the suitcase or carry-on bag 49 and, consequently provide resisting frictional forces until a rear end of the suitcase or carry-on bag 49 is completely removed from the stowage bin.

The embodiments illustrated can advantageously be configured to be positioned along various sides, orientations, etc., of an aircraft fuselage. For instance, in some embodiments, the stowage bin cover assemblies may be selectively sized and shaped to match profiles of stowage bin assemblies positioned at outboard sides of an aircraft fuselage. In some embodiments, the stowage bin cover assemblies may be selectively sized and shaped to match profiles of stowage bin assemblies positioned at a center of an aircraft fuselage.

Moreover, these and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A stowage bin cover assembly coupleable to a stowage bin, the stowage bin cover assembly comprising:
   a stowage bin cover coupleable to the stowage bin, the stowage bin cover including an edge portion having a pair of flanges angularly spaced apart which define a first groove; and
   an anti-slip strip coupleably received in the first groove, the anti-slip strip positioned and oriented to project above an uppermost outer surface of the first groove such that the anti-slip strip will frictionally engage a payload received in the stowage bin, the frictional engagement resisting movement of the payload.

2. The stowage bin cover assembly of claim 1 wherein the stowage bin cover includes an end portion and a center portion, the center portion being positioned between the end and edge portions and having an arcuate profile to overlie, when installed, a latch mechanism operable to open and close the stowage bin.

3. The stowage bin cover assembly of claim 2 wherein the center portion includes a plurality of ribs, the plurality of ribs adapted to increase a stiffness of the stowage bin cover.

4. The stowage bin cover assembly of claim 1 wherein the first groove is positioned between the edge portion and a center portion of the stowage bin cover.

5. The stowage bin cover assembly of claim 1, further comprising:
   a second groove located in an end portion, the second groove configured to coupleably receive a corresponding anti-slip strip.

6. The stowage bin cover assembly of claim 1 wherein the stowage bin cover includes a center portion, the edge portion being raised with respect to the center portion such that the edge portion at least partially obstructs movement of the payload.

7. A stowage bin cover assembly coupleable to a stowage bin, the stowage bin cover assembly comprising:
   a stowage bin cover coupleable to the stowage bin, the stowage bin cover including a first groove, wherein the stowage bin cover includes an edge portion and a center portion, the edge portion being raised with respect to the center portion such that the edge portion at least partially obstructs movement of the payload, and wherein the edge portion includes a pair of angularly spaced apart flanges and a second groove formed therebetween, the second groove being configured to coupleably receive a first anti-slip strip; and
   a second anti-slip strip coupleably received in the first groove, the second anti-slip strip positioned and oriented to project above an uppermost outer surface of the first groove such that the anti-slip strip will frictionally engage a payload received in the stowage bin, the frictional engagement resisting movement of the payload.

8. The stowage bin cover assembly of claim 1 wherein the anti-slip strip is sized and shaped to be captivatively received in the first groove.

9. The stowage bin cover assembly of claim 1 wherein the anti-slip strip is at least one of adhesively coupled to the first groove or captivatively received in the first groove.

10. The stowage bin cover assembly of claim 1 wherein the anti-slip strip comprises silicone.

11. A stowage bin cover assembly coupleable to an aircraft stowage bin moveable between a closed position and an open position, the aircraft stowage bin including a latch mechanism operable to pivotably rotate the aircraft stowage bin from the closed position to the open position to expose a payload received therein to an exterior of the aircraft stowage bin, the stowage bin cover assembly comprising:
   a stowage bin cover coupled to the aircraft stowage bin and arranged to overlie the latch mechanism, the stowage bin cover including a pair of grooves and an edge portion having a pair of flanges angularly spaced apart which define at least a first one of the pair of grooves; and
   a pair of anti-slip strips coupleably received in the respective grooves, the anti-slip strips configured to frictionally engage a contact surface of the payload, the frictional engagement resisting movement of the payload when the payload moves towards the exterior when the aircraft stowage bin is in the open position.

12. The stowage bin cover assembly of claim 11 wherein the stowage bin cover includes an end portion and a center portion, the center portion being positioned between the edge and end portions and having an arcuate profile to overlie the latch mechanism.

13. The stowage bin cover assembly of claim 12 wherein a second one of the pair of grooves is positioned between the end portion and the center portion.

14. A stowage bin cover assembly coupleable to an aircraft stowage bin moveable between a closed position and an open position, the aircraft stowage bin including a latch mechanism operable to pivotably rotate the aircraft stowage bin from the closed position to the open position to expose a payload received therein to an exterior of the aircraft stowage bin, the stowage bin cover assembly comprising:
   a stowage bin cover coupled to the aircraft stowage bin and arranged to overlie the latch mechanism, the stowage bin cover including a pair of grooves; and
   a pair of anti-slip strips coupleably received in the respective grooves, the anti-slip strips configured to frictionally engage a contact surface of the payload, the frictional engagement resisting movement of the payload when the payload moves towards the exterior when the aircraft stowage bin is in the open position, wherein the grooves include a substantially sinusoidal shaped cross-section to define a respective groove for coupleably receiving the respective anti-slip strip.

15. The stowage bin cover assembly of claim 11 wherein the at least first one of the pair of grooves is located proximal to an edge of the aircraft stowage bin such that the anti-slip strip coupleably received in the corresponding groove frictionally engages the payload until the payload is removed from the aircraft stowage bin.

16. The stowage bin cover assembly of claim 11 wherein the anti-slip strips comprise one of silicone, urethane, polyurethane, or rubber foam.

17. The stowage bin cover assembly of claim 11 wherein the stowage bin cover includes a plurality of ribs, the plurality of ribs adapted to increase a stiffness of the stowage bin cover.

18. The stowage bin cover assembly of claim 11 wherein the anti-slip strips are at least one of adhesively coupled to the respective grooves or captivatively received in the respective grooves.

19. A method to resist downward movement of luggage received in an aircraft overhead stowage bin, the method comprising:
   coupling a stowage bin cover to the aircraft overhead stowage bin, the stowage bin cover including an edge portion having a pair of angularly spaced apart flanges which define a groove; and
   coupling an anti-slip strip to the groove of the stowage bin cover, the anti-slip strip frictionally engaging the luggage to resist movement of the luggage.

20. The method of claim 19 wherein coupling the anti-slip strip comprises one of bonding the anti-slip strip to the stowage bin cover and captivatively coupling the anti-slip strip in the groove of the stowage bin cover.

* * * * *